US012779943B2

(12) United States Patent
Zheng et al.

(10) Patent No.: US 12,779,943 B2
(45) Date of Patent: Nov. 3, 2026

(54) THERMAL, ENERGY, NOISE, VIBRATION, AND HARSHNESS OPTIMIZED THERMAL SYSTEM

(71) Applicant: Zoox, Inc., Foster City, CA (US)

(72) Inventors: Qinling Zheng, Redwood City, CA (US); Srinivasa Rao Vaddiraju, Fremont, CA (US); Martin Graham Foulkes, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 320 days.

(21) Appl. No.: 18/622,975

(22) Filed: Mar. 31, 2024

(65) Prior Publication Data

US 2025/0303818 A1 Oct. 2, 2025

(51) Int. Cl.
*B60H 1/00* (2006.01)

(52) U.S. Cl.
CPC ..... *B60H 1/00814* (2013.01); *B60H 1/00735* (2013.01); *B60H 2001/006* (2013.01)

(58) Field of Classification Search
CPC ............ B60H 1/00428; B60H 1/00828; B60H 2001/006
See application file for complete search history.

(56) References Cited

U.S. PATENT DOCUMENTS

2015/0224848 A1 8/2015 Eisenhour
2017/0349031 A1 12/2017 Rollinson et al.
2021/0094383 A1 4/2021 Vader et al.

FOREIGN PATENT DOCUMENTS

CN 111572312 A 8/2020
JP S61229920 A * 10/1986
JP 2015193283 A * 11/2015
KR 102308749 B1 10/2021

OTHER PUBLICATIONS

Search Report and Written Opinion for International Application No. PCT/US25/21949, dated Jul. 17, 2025, 11 pages.

* cited by examiner

*Primary Examiner* — Eric S Ruppert
(74) *Attorney, Agent, or Firm* — Lee & Hayes, P.C.

(57) ABSTRACT

Techniques are provided for optimizing the performance of each of the components of a vehicle thermal system including a radiator system and an air conditioning system to provide desired cooling inside the vehicle cabin while simultaneously reducing the noise and potential vibration caused by operation of the individual components of the thermal system and by the operation of the components collectively. Optimizing the operating settings of each component relative to each other provides for desired interior vehicle cabin cooling while maintaining efficient thermal loading and energy use because while the speed and/or duty cycle of one component may be increased, the speed and/or duty cycle of another component may be decreased resulting in better overall thermal loading and energy efficiency.

18 Claims, 6 Drawing Sheets

Thermal – Energy – NVH Optimization Data 130

130 402 416

| | 25 C/ Noise or Vibration level 1 - n | 30 C/ Noise or Vibration level 1 - n | 35 C/ Noise or Vibration level 1 - n | 40 C/ Noise or Vibration level 1 - n | 45 C/ Noise or Vibration level 1 - n |
|---|---|---|---|---|---|
| 404 Evap Blower DC | 41% - 52% | 43% - 62% | 48% - 66% | 55% - 73% | 65% - 84% |
| 406 ACC Blower DC | 30% - 40% | 30% - 50% | 30% - 60% | 40% - 70% | 50% - 90% |
| 408 Target Disch. Temp | 22.5 C – 9.5 C | 18.5 C – 7.5 C | 15.5 C – 7.5 C | 13.1 C – 7.5 C | 10.5 C – 7.5 C |
| 410 Rad. Out Temp | 35 C – 40 C | 40 C – 45 C | 46 C – 52 C | 52 C – 58 C | 58 C – 64 C |
| 412 Rad. Fan DC | 33% - 70% | 35% - 80% | 45% - 100% | 58% - 88% | 70% - 100% |
| 414 Compressor DC | 25% - 40% | 32% - 50% | 39% - 63% | 40% - 70% | 70% - 100% |

FIG. 4

THERMAL, ENERGY, NOISE, VIBRATION, AND HARSHNESS OPTIMIZED THERMAL SYSTEM

BACKGROUND

Control of noise, vibration, and harshness (NVH) perceived by users in the interior cabin of a vehicle is very important for the usability and comfort of the user when the vehicle is in operation. Noise includes quantifiable sounds perceived in the vehicle cabin, for example, the sounds produced by mechanical components such as radiator fans, air conditioning compressors, condensers and evaporators, ventilation systems, and drive train systems. Such mechanical components may be considered noise sources. Other noises perceived by a user may include sounds external to the vehicle cabin such as road noise, wind noise and ambient background sounds such as street noise and pedestrian noise. Such sounds exterior of the vehicle cabin may be referred to as noise sources, or such sounds may be referred to as noise maskers because they may “mask” vehicle mechanical sounds. Vibration includes quantifiable oscillations felt by a user at various oscillation frequencies where the user may perceive the vibrations through contact with vehicle components such as seats, armrests, steering wheels, floors, pedals, and the like. Like noise, vibration may be caused by a vehicle’s mechanical components (noise sources) and may be caused by sounds exterior of the vehicle cabin. Harshness is a subjective attribute of noise and vibration where different users may have varying perceptions of noise and vibration, and consequently, varying diminution of comfort in the vehicle cabin caused by unpleasant noises and/or vibrations.

To combat high ambient temperatures, it may be known simply to increase the operating settings (e.g., speeds and/or duty cycles) of each of the components of the vehicle thermal system (e.g., radiator system and/or air conditioning system). However, making such changes typically only increases NVH, and increasing the operating settings of each component adds substantial thermal loading to the radiator and air conditioning systems and results in inefficient energy consumption and undesired thermal inefficiency and loading. The invention disclosed herein determines and optimizes operating settings of certain noise maker mechanical components for improving noise, vibration, and harshness perceived by users in the interior cabin of the vehicle while simultaneously optimizing the thermal and energy use performance of associated systems employing those mechanical components.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates data containing operating settings of one or more thermal system components determined based at least in part on an ambient air temperature and/or radiator coolant outlet temperature and/or observed interior cabin noises, in accordance with one or more examples of the disclosure.

DETAILED DESCRIPTION

Figure 1:
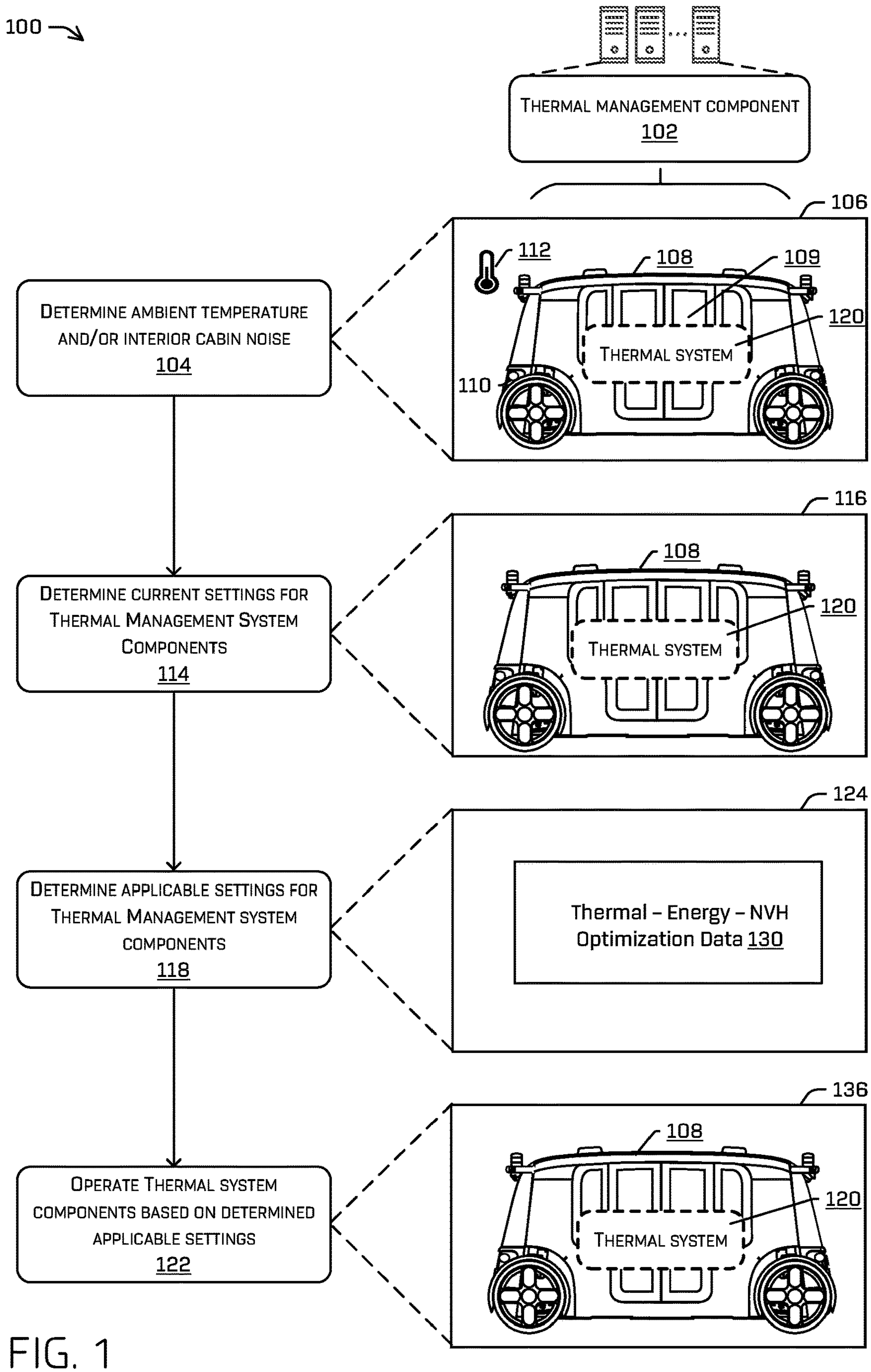
FIG. 1 is a pictorial flow diagram illustrating an example technique for determining and optimizing operating settings of one or more mechanical components for optimizing energy utilization and thermal loading, noise, vibration, and harshness in a vehicle cabin, in accordance with one or more examples of the disclosure.

As discussed above, noise, vibration, and harshness (NVH) present a problem for vehicle users who encounter unpleasant noises and vibrations in a vehicle cabin caused in part by the operation of vehicle systems such as radiator systems and air conditioning systems. Such noise makers can be particularly problematic when they are called upon to operate at high loads of operation to overcome varying ambient temperatures outside or inside the vehicle cabin. As discussed above, unpleasant noises and/or vibrations individually or in combination create a harshness environment for the vehicle user(s) that may be of varying significance to different users. In some situations, noise or vibration from outside the vehicle cabin such as road noise, wind noise, ambient background sounds such as pedestrian noise, and the like may mask unwanted and unpleasant noises and vibrations inside the vehicle cabin, but such masking is not a reliable solution against noise or vibration inside the vehicle cabin as such noise maskers may also create an unpleasant and harsh environment for vehicle users.

According to examples, a vehicle system according to the present disclosure includes a thermal system that includes a radiator system and an air conditioning system. The radiator system is operative to dissipate heat from inside the vehicle cabin via its integration with the vehicle air conditioning system and outside the vehicle cabin from a vehicle drive train (e.g., combustion, electric or hybrid engine/motor) and from certain associated components such as battery systems and computer systems. The thermal system also includes an air conditioning system for cooling an interior cabin of the vehicle. The radiator system may include a radiator through which a coolant fluid passes for capturing and rejecting heat into the ambient environment from a vehicle motor, battery system and/or vehicle computing system. A radiator fan may be included for passing cool air over the radiator for lowering the temperature of the coolant flowing through the radiator to further a process of rejecting heat into the ambient environment generated by vehicle components (e.g., motor, battery system, computing system, etc.).

The air conditioning system is operative to cool the inside of the vehicle cabin to provide a pleasant temperature for vehicle users. The air conditioning system includes an air conditioning (AC) condenser with an AC condenser blower for collecting and releasing heat from the vehicle cabin. An air conditioning compressor is typically included that is responsible for pressurizing and heating refrigerant for increasing system energy efficiency and for causing cooling when the pressurized refrigerant is released through an evaporator. The evaporator converts pressurized liquid refrigerant to gaseous refrigerant making the gaseous refrigerant cooler for absorbing heat from air inside the vehicle cabin, and consequently, for providing cooling inside the vehicle cabin. An evaporator blower is typically provided for blowing air over cooled coils of the evaporator and for moving the resulting cooled air into the vehicle cabin. A liquid cooled condenser (LCC) is provided that integrates the radiator system with the air conditioning system. The LCC is a heat exchanger device that removes heat from air conditioning refrigerant and transfers the heat to liquid running through it and then through the radiator system for dissipating heat to the outside environment. Additional techniques, systems and methods for thermal management for vehicle systems (inside and outside a vehicle cabin) may be found, for example, in U.S. Pat. No. 11,279,206 B1, titled "Heating Ventilation and Air Conditioning (HVAC) System," dated Mar. 22, 2022, and in U.S. Pat. No. 11,659,696 B2, titled "Vehicle Computer Cooling Architecture," dated May 23, 22023, which are incorporated by reference herein in their entirety.

According to examples, the radiator system and air conditioning system work in harmony where operating performance of one or more components of the radiator system affects the operating performance of one or more components of the air conditioning system. For example, for a given power usage of the various components of the radiator system and air conditioning system, for a given ambient air temperature outside the vehicle and/or noise or vibration level inside the vehicle cabin, the components of each of the radiator system and the air conditioning system may adjusted dynamically, iteratively and in real time to achieve desired energy and thermal efficiency and desired management of NVH. Adjustment of the components of the radiator system and the air conditioning system may also provide for desired heat dissipation and cabin cooling while simultaneously optimizing thermal and energy efficiency and improving NVH performance inside the vehicle cabin.

According to examples, operation of the components of the radiator system and air conditioning system (thermal system) generate sounds that translate into the vehicle cabin as cabin noise. The operation of these components may also generate vibration that may be felt by users in the vehicle cabin. The resulting noise and potential vibration may increase harshness in the environment inside the cabin. In a typical operating environment, as temperatures inside the vehicle cabin increase requiring the cooling effects of the air conditioning system, the speeds or duty cycles (e.g., the percentage of time a component is operating) of operation of each of these components may be increased such that as temperatures increase, the resulting noise and potential vibration from these components increases making the noise, vibration and resulting harshness experience inside the vehicle cabin worse. This is particularly problematic in high heat environments that often are experienced in late spring, summer, and early fall seasons.

As discussed above, simply increasing the operating settings (e.g., speeds and/or duty cycles) of each of the components of the radiator system and air conditioning system may increase cooling but may make NVH in the vehicle cabin worse as noise and potential vibration from each component is increased. In addition, increasing the operating settings of each component independent of operating setting of other components of the radiator and air conditioning systems adds substantial thermal loading to the radiator and air conditioning systems components and results in inefficient energy consumption and thermal performance.

According to examples of the present disclosure, techniques are provided for optimizing the performance of each of the components of the radiator system and air conditioning system to provide desired cooling inside the vehicle cabin while simultaneously reducing the noise and potential vibration caused by operation of the individual components and by the operation of the components collectively. Furthermore, optimizing the operating settings of each component relative to each other provides for desired interior vehicle cabin cooling while maintaining efficient thermal loading and energy use because while the speed and/or duty cycle of one component may be increased, the speed and/or duty cycle of another component may be decreased resulting in better overall thermal loading and energy efficiency.

Each of the components of the radiator and air conditioning systems generates varying levels of noise and potential vibration during operation depending on the operating settings of each component adjusted to account for varying temperature levels inside the vehicle cabin. For example, noise and potential vibration from the radiator fan may be considered relatively low. Noise and potential vibration from the AC condenser blower may be considered low to medium depending on its operating setting. Noise and potential vibration from the AC evaporator blower may be considered low to high depending on the ventilation setting for moving air over evaporator coils and into the vehicle cabin. And noise and potential vibration from the AC compressor may be considered high, particularly, during high temperature environments requiring a more robust duty cycle for the AC compressor.

According to examples of the present disclosure, instead of operating each of the components independently of each other, operation of the components is controlled collectively to optimize the cooling, heat rejection, energy efficiency and thermal performance of the components while simultaneously reducing the noise and potential vibration of the collection of components operated individually. For example, for a given ambient temperature outside the vehicle cabin, or alternatively, for a given noise or vibration level observed inside the vehicle cabin, the operating settings for each component may be adjusted so that the desired cooling and heat rejection is achieved, but so that the noise and potential vibration and resulting harshness from the collection of components is reduced. For example, for a given ambient temperature outside the vehicle cabin or for a given noise or vibration level inside the vehicle cabin, the radiator fan speed may be increased, the AC condenser blower speed may be maintained at a current level, the operation of the AC compressor may be decreased, and the operation of the evaporator blower may be decreased such that the noise and potential vibration from the collection of components is decreased while the desired cooling and heat rejection is increased. As should be understood, this is but one example optimization and is not limiting of a number of optimization settings that may be utilized at different ambient temperatures outside the vehicle cabin or at different observed noise or vibration levels inside the vehicle cabin.

According to examples, based on testing and observation, a number of different radiator system and air conditioning system operating settings may be generated for automatically setting operation of the components of the radiator system and air conditioning system at different ambient temperatures outside the vehicle cabin or at different observed noise or vibration levels inside the vehicle cabin. For example, one optimization of operation of the components of the radiator system and air conditioning system may be determined for an exterior ambient temperature of 25° C. or an interior cabin noise level of 30 decibels (dB) while a different optimization of operation of the components may be determined for an exterior ambient temperature of 45° C. or an interior cabin noise level of 90 dB. That is, for each exterior ambient temperature or observed interior cabin noise or vibration level, an optimization of the operation of the individual components of the radiator system and air conditioning system may be determined and may be utilized automatically for resetting the operation of the individual components when the exterior ambient temperature or observed interior cabin noise or vibration level reaches different levels. Thus, the noise and potential vibration (and resulting harshness) from the collection of components may be automatically adjusted to optimize operation of the collection of components to reduce NVH at varying exterior ambient temperatures or observed interior cabin noise or vibration levels while also maintaining desired energy efficiency and thermal performance.

After optimized settings for the components of the radiator system and air conditioning system are determined based on testing and observation at varying levels of exterior ambient temperature and/or observed interior cabin noise, optimized settings for each of the varying temperatures and noise or vibration levels are stored for subsequent use. At varying levels of exterior ambient temperature and/or interior cabin noise or vibration levels, the stored settings (or real time "on the fly" settings determinations, as described below) for optimizing heat dissipation, cabin cooling and NVH in a manner that is energy efficient and that provides good thermal performance may be automatically set for various system components. That is, the optimized settings for the experienced temperatures and/or noise or vibration levels may then be automatically applied to the components of the radiator system and/or air conditioning system to provide for desired cooling inside the vehicle cabin while simultaneously reducing noise or vibration levels at or below a threshold level (e.g., 30 decibels) experienced by a user inside the vehicle cabin. Applying optimized settings for each of the radiator and/or air conditioning systems allows some components to operate at higher speeds or duty cycles while other components operate at lower speeds or duty cycles, and thus, the thermal loading of the overall system may be reduced and/or the system may be operated with improved energy consumption and thermal performance.

According to examples, management and implementation of optimization of radiator and/or air conditioning system components is performed by a thermal management system (also referred to herein as a "thermal management component" or a "thermal system manager"). The thermal management system may be configured to manage operation of the components of the radiator system and/or air conditioning system, as described above, for detecting ambient temperature outside the vehicle cabin and/or noise or vibration levels inside the vehicle cabin and for determining operating settings of these components for reducing NVH while providing desired vehicle cabin cooling in a thermal and energy efficient manner. According to examples, the thermal management component may leverage various sensor devices to determine an ambient temperature of an environment in which the vehicle operates and to determine current operating settings and/or duty cycle progress of one or more of the components of the radiator system and air conditioning system.

In addition, the thermal management component may utilize an acoustic sensor (e.g., microphone) or other noise capturing or detecting device situated inside vehicle cabin for observing and recording noise levels inside the vehicle cabin for use in optimizing radiator system and air conditioning system settings based on noise levels inside the vehicle cabin as opposed to basing optimization settings on ambient temperature outside the vehicle cabin. Similarly, the thermal management component may utilize a vibration sensing or detecting device situated inside vehicle cabin for observing and recording vibration levels inside the vehicle cabin for use in optimizing radiator system and air conditioning system settings based on vibration levels inside the vehicle cabin as opposed to basing optimization settings on ambient temperature outside the vehicle cabin alone.

The techniques discussed herein can improve a functioning of the computing device of the vehicle in a number of ways. That is, in some examples, the techniques described herein can improve the functioning, safety, and/or efficiency of autonomous, semi-autonomous and non-autonomous vehicles operating in various driving environments. In examples, the thermal management component may optimize performance of the vehicle thermal system via a computing device operative to control operation of the components of the vehicle thermal system. According to examples, one or more sensors may be associated with each component of the thermal system (e.g., radiator system components and air conditioning system components). Each sensor may provide information such as radiator fans speeds, AC condenser blower speeds, evaporator blower speeds, and/or performance data associated with each component, for example, radiator coolant temperatures, radiator outlet temperature, AC compressor pressure performance and evaporator depressurization and/or cooling performance. As ambient temperature outside the vehicle cabin increases and/or as noise or vibration levels inside the vehicle cabin increase, the computing system may receive sensor data for each component of the thermal system. Sensor data for each component of the thermal system may be used by the computing device for determining that the operating settings of each component of the thermal system may need to be rebalanced to optimize performance based on the received sensor data.

According to examples, the computing device may parse a database of precomputed optimization settings, and/or the computing device may rebalance operating settings of each component of the thermal system to an optimization balance that is different from a previously constructed optimization balance. For example, if the current optimization settings balance places a majority of heat rejection responsibility on a radiator which provides for lower energy consumption and lower interior NVH impact, the computing device, via one or more sensors associated with the radiator fan or radiator outlet temperature, may detect the radiator fan or outlet temperature is becoming inefficient and is impacting noise or vibration levels (e.g., the radiator fan is running continuously). In such a case, the computing device may parse a database of component optimization settings for a setting associated with the current ambient temperature exterior of the vehicle cabin and/or associated with a current observed noise or vibration levels inside the vehicle cabin.

According to examples, if data in the database does not provide a satisfactory result, for example, where the current optimization settings balance is already set according to the current ambient temperature outside the vehicle cabin or the current noise or vibration levels inside the vehicle cabin, the computing device may make a change to the current optimization settings balance based on one or more known or synthesized changes. According to the present example, the computing device may determine that, given that the radiator fan is running in an inefficient manner, the radiator fan speed or duty cycle should be decreased and that the speed or duty cycle of the AC condenser blower should be increased to reduce the burden on the radiator fan while maintaining the desired thermal performance, energy consumption and NVH attributes of the thermal system.

According to examples, a number of previously established paths may be provided to allow the computing device to generate thermal system optimization balances not available via precomputed and stored settings. For example, following from the above example, if a previously established setting for the radiator fan is not available the computing device may rely on other information for optimizing performance of radiator and air conditioning settings for achieving desired results. For example, as described below with reference to FIG. 4, instead of storing precomputed optimization settings, the computing device may utilize known performance information for the various components (e.g., noise or vibration levels associated with various component operating speeds or duty cycles) for generating settings for the various components “on the fly” in real time.

According to other examples, the computing device may implement one or more machine learning models, statistical models, or a combination thereof for determining changes to optimization settings balance. That is, the computing device may utilize a machine learning model that learns from a training data set to improve accuracy of an output (e.g., a prediction). Additionally, or alternatively, the computing device may utilize a statistical model that is representative of logic and/or mathematical functions that generate approximations which are usable to make predictions and corresponding changes to the current optimization settings balance for the components of the vehicle thermal system.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is a pictorial flow diagram illustrating an example technique for determining and optimizing operating settings of one or more mechanical components for optimizing energy utilization and thermal loading, noise, vibration, and harshness in a vehicle cabin, in accordance with one or more examples of the disclosure.

The pictorial flow diagram illustrated in FIG. 1 provides a high-level summary of components of a vehicle 108 and how the operation of a thermal system of the vehicle 108 may be optimized for improving NVH in a vehicle cabin 109 in a manner that maintains or improves thermal and energy use performance. Detailed illustrations and description of components and operation of the vehicle thermal system are provided below with reference to FIGS. 2-6.

As shown in this example, some or all operations in the example process 100 may be performed by a thermal management component 102 integrated within an autonomous, semi-autonomous or non-autonomous vehicle. As shown in this example, process 100 may be implemented using a thermal management component 102. As described in more detail below, the thermal management component 102 may include various components, which may be configured to determine or otherwise receive ambient temperature outside the vehicle cabin and/or noise or vibration levels inside the vehicle cabin for determining an optimization settings balance to be applied to thermal system components including the components of a vehicle radiator system and a vehicle air conditioning system for reducing or maintaining noise, vibration and harshness (NVH) inside the vehicle cabin while simultaneously maintaining thermal and energy consumption performance.

At operation 104, the thermal management component 102 may determine ambient temperature exterior of the cabin 109 of the vehicle 108 and/or noise or vibration levels inside the cabin 109 of the vehicle 108. For example, at operation 104, the thermal management component 102 may determine that the ambient temperature outside the vehicle cabin 109 is 30 degrees Celsius and that the noise level inside the vehicle cabin 109 is 40 decibels (dB). As should be appreciated, these are but examples of possible ambient temperatures and noise or vibration levels. In some examples, the vehicle 108 may include multiple sensor devices mounted at various locations and various angles relative to the vehicle, to capture ambient temperature data of a driving environment. For example, box 106 illustrates an autonomous vehicle 108 capturing sensor data of the ambient air temperature. In examples, the autonomous vehicle 108 may include a temperature sensor device 110 mounted or otherwise installed at an end of the vehicle; however, in other examples, the temperature sensor device 110 may be located at a different position on the autonomous vehicle 108. For instance, the sensor device 110 may alternatively be located on either horizontal or vertical end of the vehicle and/or within the one or more sensor pods or groupings disposed at a top portion of the vehicle 108. In some examples, the sensor device 110 may capture an ambient temperature proximate the sensor device 110. In such instances, the ambient temperature 112 may represent the temperature of the air external to the vehicle and proximate the sensor device 110. In addition, the vehicle 108 may include one or more acoustic sensors (e.g., microphones—not shown in FIG. 1 but detailed further below with reference to FIG. 2) or other suitable noise capturing devices in the interior of the vehicle cabin 109 for capturing noise levels inside the vehicle cabin. The vehicle 108 may also include one or more vibration sensors (described below with reference to FIG. 2) for capturing vibration levels inside the vehicle cabin.

At operation 114, the thermal management component 102 may determine current operating settings for one or more components of the thermal system 120. According to one example, the thermal management component 102 may query a database (not shown in FIG. 1 but discussed further below with reference to FIG. 3) for current operating settings applied to the components of the thermal system 120. If current operating settings are not stored for the thermal system 120, the thermal management component 102 may capture current operating settings for the components of the thermal system 120 via one or more sensors. The box 116 illustrates thermal management component 102 of the autonomous vehicle 108 capturing sensor data representative of the components of the thermal system (see FIG. 2), for example, including, but not limited to, radiator fan speed and/or duty cycle, radiator coolant outlet temperature, AC condenser blower speed and/or duty cycle, evaporator fan speed and/or duty cycle, evaporator target discharge temperature into the vehicle cabin 109 and/or AC compressor duty cycle.

At operation 118, the thermal management component 102 may determine applicable thermal system operating settings for the thermal system 120 components based on the exterior ambient temperature and/or interior cabin noise or vibration levels captured at operation 104. In this example, the exterior ambient temperature and/or interior cabin noise or vibration levels are used by the thermal management component 102 to parse a thermal, energy and NVH system data 130 (also referred to herein as "system data") for obtaining operating settings for each component of the thermal system 120 applicable to the current exterior ambient temperature and/or the interior cabin noise or vibration levels. Alternatively, as discussed above, the thermal management component 102 may determine operating settings in real time based on current operating settings, ambient outside temperature, cabin noise and/or vibration levels and based on known information about system components (e.g., cabin noise associated with a given radiator fan speed).

The box 124 illustrates a relationship of the data stored for system components (see FIG. 4) with the thermal management component 102 for providing the thermal management component 102 with operating settings for the components of the thermal system 120, as described herein. If the current operating settings for the components of the thermal system 120 match the operating settings for the components corresponding to the exterior ambient temperature and/or interior cabin noise or vibration levels, then the thermal management component 102 may direct the components of the thermal system to continue operation with current operating settings. On the other hand, if the operating settings for the components of the thermal system 120 obtained from the system data 130 based on the exterior ambient temperature and/or the interior cabin noise or vibration levels differ from the current operating settings, then the system may rebalance the operating settings of the components of the thermal system 120 to the settings obtained from the system data 130 or as dynamically determined based on current conditions.

At operation 122, the thermal management component 102 controls operation of one or more of the components of the thermal system 120 by setting each component of the thermal system 120 to respective operating settings obtained from the system data 130 based on the exterior ambient temperature and/or noise or vibration levels inside the vehicle cabin 109 or as determined dynamically based on current conditions. At operation 122, the thermal management component 102 may operate the components of the thermal system 120 according to retrieved or determined operating settings. The box 136 illustrates operation of the vehicle 108 according to the operating settings applied to the components of the thermal system 120.

Figure 2:
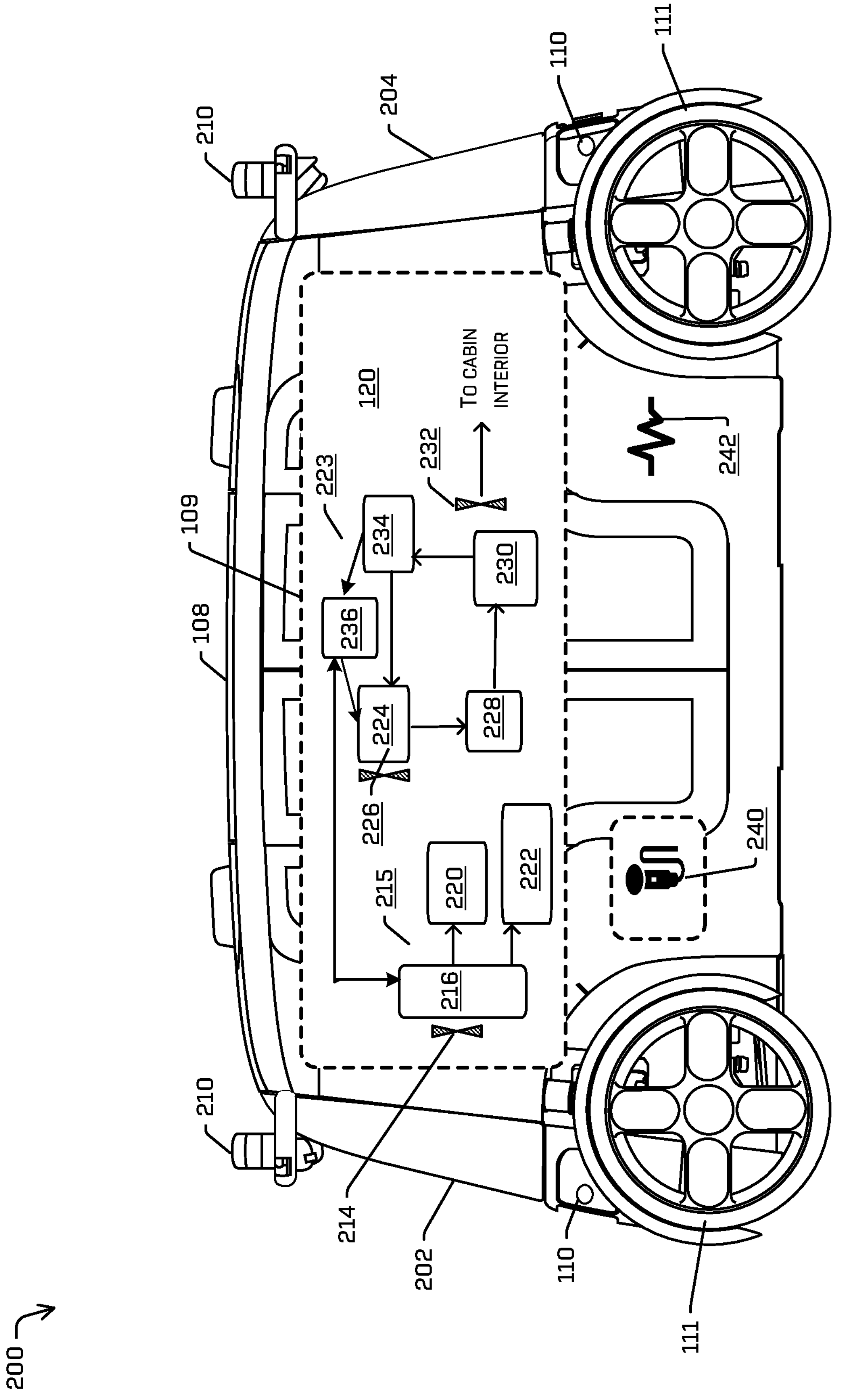
FIG. 2 illustrates an example vehicle including components of a vehicle radiator system and air conditioning system, in accordance with one or more examples of the disclosure.

FIG. 2 illustrates detailed components of the vehicle 108 described above with reference to FIG. 1. Referring to FIG. 2, the vehicle 108 is illustrated as a bi-directional autonomous vehicle that may operate seamlessly in both directions as needed. As should be appreciated, the bi-directional vehicle 108 illustrated in FIG. 2 is for purposes of example only and is not limiting of other types of vehicles with which aspects of the present disclosure may be practiced. For example, instead of the bi-directional autonomous vehicle 108 illustrated in FIG. 2, aspects of the present disclosure may be applicable to uni-directional vehicles, semi-autonomous vehicles, non-autonomous vehicles, and/or any other vehicles.

The vehicle 108 includes the vehicle cabin 109 in which vehicle users may be transported as desired. The vehicle 108 rests on wheels 111 for providing movement of the vehicle. Movement of the vehicle 108 may be enabled by an electric drive train system (not illustrated), a hybrid electric/combustion engine drive train system (not illustrated), or by a combustion drive train system (not illustrated). A leading end 202 and a trailing in 204 are illustrated, but when the bi-directional vehicle 108 travels in an opposite direction, then the end 202 serves as the trailing end, and the end 204 serves as the leading end.

As described above with reference to FIG. 1, the autonomous vehicle 108 may include the temperature sensor device 110 mounted or otherwise installed at an end of the vehicle; however, in other examples, the temperature sensor device 110 may be located at a different position on the autonomous vehicle 108. For instance, the temperature sensor device 110 may alternatively be located on either horizontal or vertical end of the vehicle and/or within the one or more of the sensor pods disposed at a top portion of the vehicle 108. In some examples, the temperature sensor device 110 may capture an ambient temperature proximate the temperature sensor device 110. In such instances, the ambient temperature 112 may represent the temperature of the air external to the vehicle and proximate the temperature sensor device 110. As illustrated in FIG. 2, the vehicle 108 can include multiple instances of the temperature sensor device 110.

The vehicle 108 may include one or more acoustic sensors 240 (e.g., microphones) or other suitable noise capturing devices in the interior of the vehicle cabin 109 for capturing noise levels inside the vehicle cabin 109. Captured noise levels may be utilized by the thermal management component for making changes to component operating settings for reducing noise levels inside the vehicle cabin. In addition, the vehicle 108 may include one or more vibration sensors 242 for detecting and capturing vibration levels inside the vehicle cabin 109. A number of vibration sensors may be used for detecting and capturing vibration levels, for example, accelerometers or other suitable vibration detection devices, which detect vibration based on movement detected in interior cabin equipment and components. As well known, vibration sensors detect the frequency and magnitude of vibrations instantaneously or over time and may be used according to examples of the present disclosure for determining vibration levels for then determining whether operating settings (e.g., radiator or compressor fan speeds) should be changed to reduce vibration.

Referring still to FIG. 2, the vehicle 108 includes the thermal system 120 comprised of the radiator system 215 and an air conditioning system 223. The radiator system 215 includes a radiator 216 through which a coolant fluid passes for capturing and rejecting heat into the ambient environment from one or more vehicle operating components. Such components can include a vehicle motor 220, a battery system and/or vehicle computing system 222, and/or any other component that may require cooling. A radiator fan 214 may be included for passing cool air over the radiator for lowering the temperature of the coolant flowing through the radiator to further a process of rejecting heat into the ambient environment generated by vehicle components (e.g., motor, battery system, computing system, etc.). In some examples, the radiator system portion of the thermal system 120 may include one or more sensor devices (located proximate the radiator(s)) configured to determine a radiator coolant temperature, e.g., an inlet temperature and/or an outlet temperature, which may be used to determine operating settings for the radiator(s) according to aspects of the disclosure. In the case of two radiators, a sensor may be required for both radiator fans 214 to allow monitoring and adjustment of radiator operating settings for each radiator independently.

According to examples, the radiator system 215 may operate on one end of the vehicle 108 as illustrated in FIG. 2. However, in the case of a bi-directional vehicle as is illustrated in FIG. 2, it may be advantageous to operate a dual radiator system 215 where a first instance of the radiator 216 and of the radiator fan 214 is positioned at the first end 202 of the vehicle, and a second instance of the radiator 216 and of the radiator fan 214 is positioned at the second end of the vehicle 108. Accordingly, when the vehicle 108 is operating in both directions, air flow into the radiator 216 assisted by radiator fan 214 will be available in both directions of travel. As should be appreciated, depending on thermal loading required for dissipating heat from the vehicle motor 220 and the battery and computing system 222, only the radiator 216 on the end 202, 204 in the direction of travel may be operated at any given time. Alternatively, if the vehicle 108 is equipped with two radiators 216, both radiators 216 may be always operated during vehicle operation.

According to examples, the vehicle 108 may include two battery/computer compartments (one at each end 202, 204 of the vehicle) to provide adequate battery and computing capacity for the vehicle 108. In such a dual battery/computing system arrangement, a dual radiator system may be necessary for adequate heat dissipation. Ultimately, use of one or two radiators 216 is dependent on heat dissipation and cooling loading required for maintaining thermal performance of the motor 220 and the battery/computer system 222. If the drive train of the vehicle 108 is electric, more heat dissipation may be required for the battery and computer system. Alternatively, if the drive train of the vehicle 108 is hybrid (electric and combustion) or combustion only, then significant heat dissipation resources of the radiator 216 may be needed for heat dissipation associated with engine/motor performance.

The air conditioning system 223 is operative to cool the inside of the vehicle cabin, for example, to provide a pleasant temperature for vehicle users. The air conditioning system 223 includes an air conditioning (AC) condenser 224 with an AC condenser blower 226 for collecting and releasing heat from the vehicle cabin. An air conditioning compressor 234 is included that is responsible for pressurizing and heating refrigerant for increasing system energy efficiency and for causing cooling when the pressurized refrigerant is released through an evaporator. The evaporator 230 converts pressurized liquid refrigerant to gaseous refrigerant making the gaseous refrigerant cooler for absorbing heat from air inside the vehicle cabin, and consequently, for providing cooling inside the vehicle cabin. An evaporator blower 232 is provided for blowing air over cooled coils of the evaporator and for moving the resulting cooled air into the vehicle cabin 109. An air conditioning dryer 228 is provided for removing moisture from depressurizing gaseous refrigerant before it may enter the evaporator 230.

A liquid cooled condenser (LCC) 236 is provided that integrates the radiator system with the air conditioning system. The LCC is a heat exchanger device that removes heat from air conditioning refrigerant and transfers the heat to liquid running through it and then through the radiator system for dissipating heat to the outside environment. According to examples of the present disclosure, the LCC 236 integrates operation of the radiator system 215 with the air conditioning system 223 by dissipating heat from the air conditioning system refrigerant via the radiator system. Thus, the radiator system and air conditioning system depend on each other for optimized performance, and the operating settings for the radiator system directly impact the operating settings for the air conditioning system and vice versa.

As described herein, according to examples, operation of the components of the radiator system and air conditioning system (thermal system) generate sounds that translate into the vehicle cabin as cabin noise. The operation of these components may also generate vibration that may be felt by passengers in the vehicle cabin. The resulting noise and/or potential vibration may increase harshness in the environment inside the cabin. Controlling the performance of each of the components of the thermal system 120 (radiator system 215 and air conditioning system 223) may provide desired heat dissipation of the radiator and associated components and provide cooling inside the vehicle cabin while simultaneously reducing the noise and potential vibration caused by operation of the individual components and by the operation of the components collectively. Furthermore, controlling the operating settings of the various components relative to each other may provide for efficient thermal loading and energy use because while the speed and/or duty cycle of one component may be increased, the speed and/or duty cycle of another component may be decreased resulting in better overall thermal loading and energy efficiency.

Figure 3:
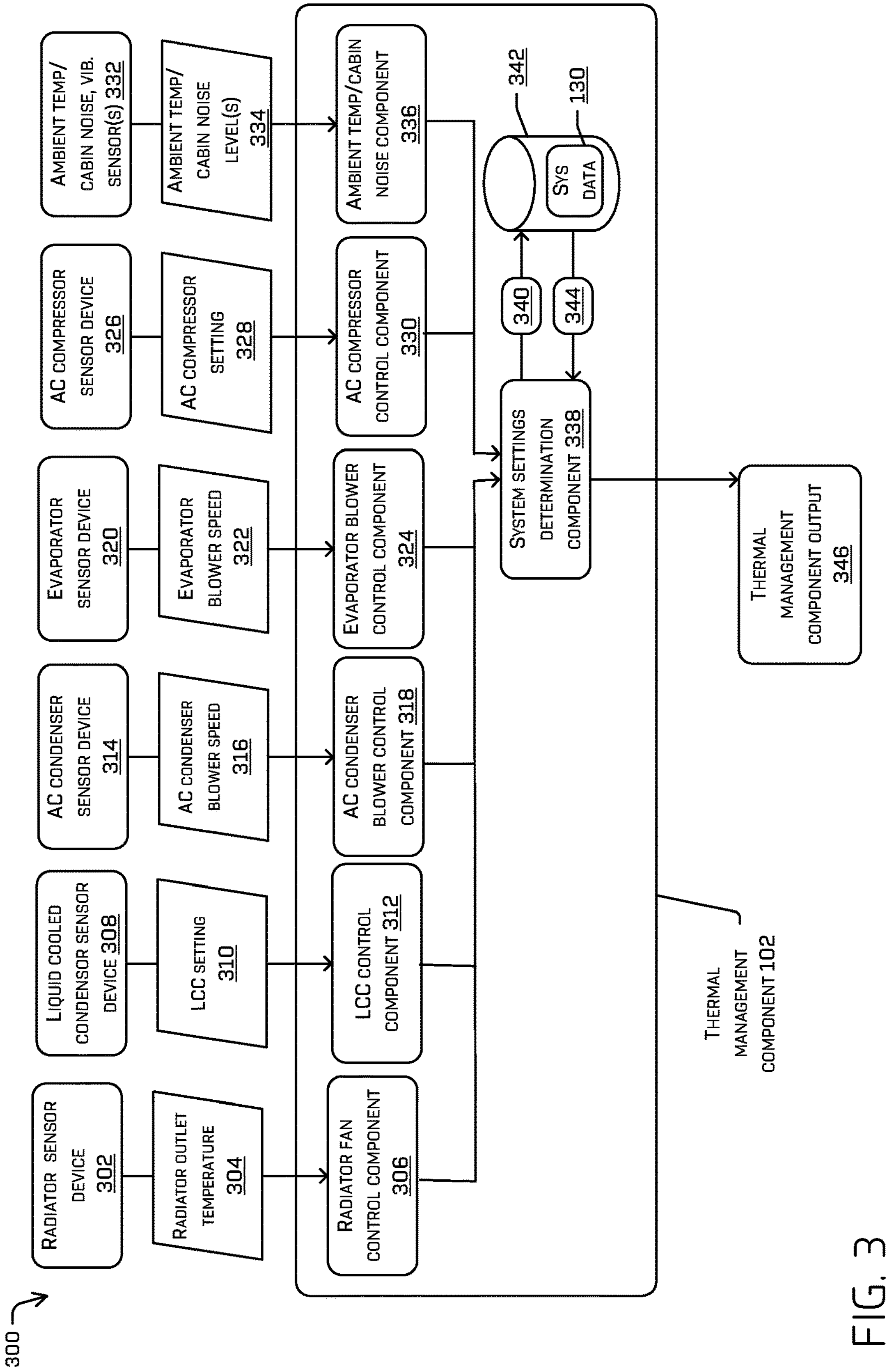
FIG. 3 illustrates an example computing system including a thermal management component configured to optimize operating settings of one or more mechanical components for optimizing energy utilization and thermal loading, noise, vibration, and harshness in a vehicle cabin, in accordance with one or more examples of the disclosure.

FIG. 3 illustrates an example computing system 300 including the thermal management component 102 configured to optimize operating settings of the components of the thermal system 120 (e.g., the radiator system 215 and air conditioning system 223) to reduce noise, vibration and harshness while maintaining thermal and energy consumption efficiency. According to examples of the present disclosure, the thermal management component 102 is configured to receive sensor information from components of the radiator system (e.g., radiator fan speed and radiator coolant outlet temperature) and from the air conditioning system (e.g., AC condenser, evaporator, AC compressor), as well as sensor information for environmental conditions such as exterior ambient temperature and internal cabin noise and/or vibration. Based on this sensor information, the thermal management component 102 is operative to determine and implement via the computing system 300 optimized settings of the components of the thermal system 120 as described herein. In some cases, the thermal management component 102 may be implemented within or otherwise associated with a perception component, a prediction component, a planning component, and/or any other component of an autonomous vehicle.

Referring still to FIG. 3, a radiator sensor device 302 is operative to detect and report radiator outlet temperature 304 for allowing the thermal management component 102 to make changes to the radiator fan settings as required for optimization of radiator performance relative to other system components. A liquid cooled condenser (LCC) sensor device 308 is operative to detect LCC duty cycle progress and associated information impacting coolant temperatures and system operating settings. An AC condenser sensor device 314 is operative to detect AC condenser blower speed and duty cycle progress for allowing the thermal management component 102 to make changes to the AC condenser settings as required for optimization of AC condenser performance relative to other system components. Sensors 320, 326, similarly detect and report performance data for the evaporator and AC compressor, respectively for allowing the thermal management component 102 to make changes to their operating settings as required for optimization relative to other system components. In addition, the thermal management component 102 receives exterior ambient temperature and interior cabin noise and vibration sensor data 332 for determining whether optimization balancing or rebalancing is required for the thermal system components to reduce or maintain noise, vibration and harshness (NVH) in the vehicle cabin 109.

After all sensor data is received by the thermal management component 102, the sensor data is processed by the system settings determination component 338. The processed data is formatted into a data query 340 to the database 342 for parsing the system data 130 for operating settings for each of the thermal system components and is returned in a response 344 back to the system settings determination component 338. Required operating settings for the thermal system components are passed back to the thermal management component 102 as output 346 which is then used by the thermal management component 102 for optimizing the operating settings of the thermal system components, as described herein.

FIG. 4 illustrates system data 130 containing operating settings of one or more thermal system components determined based at least in part on an ambient air temperature and/or observed interior cabin noises or vibration, in accordance with one or more examples of the disclosure. According to examples, the system data 130 is maintained at the database 342 and includes correlations of first operating settings associated with components of the radiator system and second operating settings associated with components of the air conditioning system for providing an overall thermal cooling requirement and a noise or vibration level inside the vehicle cabin associated with the first and second operating settings. As described above, according to examples, the thermal management component 102 queries the system data 130 for obtaining operating settings for one or more of the components of the thermal system 120 for optimizing performance of the thermal system 120 for maintaining or improving NVH in the vehicle cabin 109 while simultaneously maintaining thermal and energy consumption performance.

Referring to the system data 130, across the top row is situated a number of cells containing different levels of ambient temperatures detected outside the vehicle cabin. In addition to ambient temperature levels, interior cabin noise or vibration levels are provided. As should be appreciated, the interior cabin noise or vibration levels are not associated with the ambient temperature levels but are another way of optimizing thermal system component operating settings. Down the left column of the system data 130 are identifiers for thermal system component attributes, for example, evaporator blower duty cycle 404 or radiator outlet temperature 410. Reading down from a given ambient temperature level or internal cabin noise or vibration level heading, an operating setting for each thermal system component is designated.

According to examples, the operating settings for each thermal system component are generated via testing and research to generate sound fields comprising optimum settings for each exterior ambient temperature observation or interior cabin noise or vibration level observation. For example, if the exterior temperature outside the vehicle cabin 109 is observed to be 35 degrees Celsius, the thermal management component 102 will query the system data 130 and obtain the operating settings for each corresponding thermal system component for that ambient temperature level. Alternatively, if a noise or vibration level inside the vehicle cabin caused by operation of a combination of the operating thermal system components is observed as noise level 4, for example, 55 decibels (dB) or at a given vibration level, the thermal management component 102 will query the system data 130 and obtain the operating settings for each corresponding thermal system component for that noise or vibration level. Thus, the system data 130 can be queried based on ambient temperature external of the vehicle cabin 109, or the system data 130 can be queried based on noise or vibration levels observed inside the vehicle cabin 109 caused by operation of thermal system components.

Referring still to FIG. 4, the system data 130 illustrated for various ambient temperature levels and example noise or vibration levels are for purposes of example and are not limiting of other ambient temperatures and/or noise or vibration levels for which operating settings for the thermal system components may be generated. According to one example, the system data 130 may be stored and accessed via a lookup table that allows the thermal management component 102 to parse the lookup table for a given ambient temperature, noise level, vibration level or combination thereof for retrieving a set of system operating settings that may be automatically applied. However, as should be understood, for a given ambient temperature, there may be a number of observed cabin noise levels or vibration levels cause by other factors. For example, the ambient temperature may be relatively low, but cabin noise levels may be high owing to other factors such as occupant noise (e.g., talking, music playing, etc.).

In addition, as described above, if a given exterior vehicle ambient temperature or noise or vibration level is not represented in the system data 130, the thermal management component 102 may be operative to intelligently interpolate or extrapolate component operating settings based on one or more software computer-controlled solutions, machine learning models, statistical models, or a combination thereof for determining changes to optimization settings balance. The thermal management component 102 may access known data associated with known noise and/or vibration levels. For example, the thermal management component 102 may be able to access data showing that at a certain rounds per minute (rpm) currently observed for the radiator fan 214, a given cabin noise level is experienced. Similarly, the thermal management component may access data showing that for a combination of a given radiator outlet temperature and a current air conditioning compressor duty cycle, a given vibration level is experienced. For another example, if the thermal management component detects a high level of cabin noise not caused by radiator or air conditioning system components (e.g., caused by noisy cabin components playing loud music, engaging in loud conversations, and the like), the thermal management component may determine that the internal cabin noise is masking system component noise so that no system operating settings change are needed. On the other hand, if the combination of non-system cabin noise and system component noise can be improved by making changes to system operating settings, then the thermal management component 120 may make changes as described herein for improving the resulting NVH. Based on such information, the thermal management component 120 may dynamically determine changes to one or more system component operating settings without the need for accessing precomputed operating settings as illustrated in FIG. 4.

As described above, after the thermal management component 102 obtains or determines operating settings for the thermal system 120 components, the thermal management component 102 balances the operation of the components with the obtained or determined settings to optimize performance of the collection of components for improving NVH in the vehicle cabin. According to examples, this process may be performed iteratively, continuously and in real time. That is, a feedback look may be employed by the thermal management component 102 that continuously feeds current ambient temperature, noise levels and vibration levels to the thermal management component to allow the thermal management component to continuously monitor and adjust operating settings based on current environmental conditions.

Figure 5:
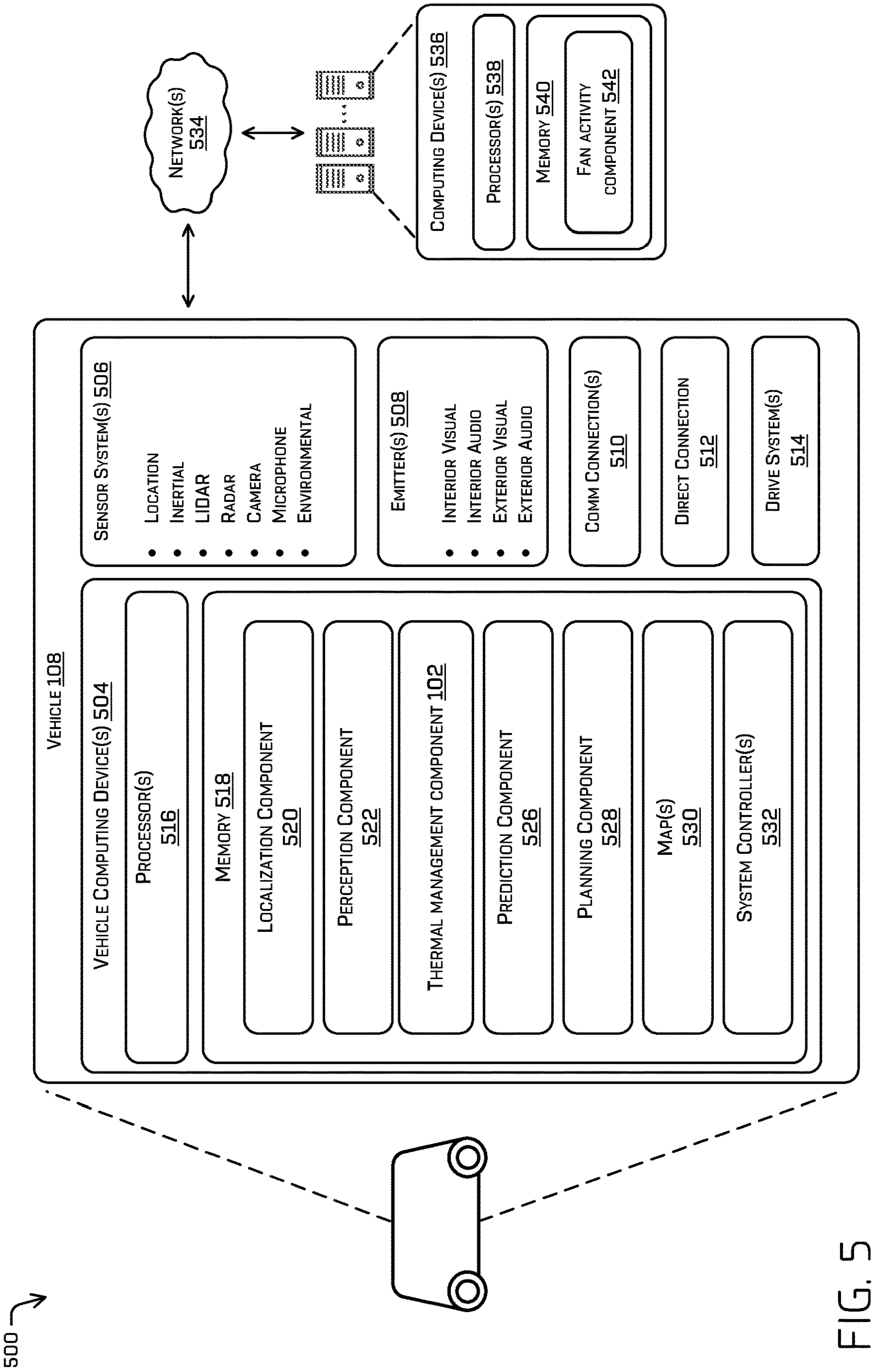
FIG. 5 depicts a block diagram of an example system for optimizing operating settings of one or more mechanical components for optimizing energy utilization and thermal loading, noise, vibration, and harshness in a vehicle cabin, in accordance with one or more examples of the disclosure.

FIG. 5 is a block diagram of an example system 500 for implementing the techniques described herein. In at least one example, the system 500 may include a vehicle, such as vehicle 108. The vehicle 108 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 108 is an autonomous vehicle; however, the vehicle 108 could be any other type of vehicle, such as a semi-autonomous vehicle, or any other system having at least an image capture device (e.g., a camera-enabled smartphone). In some instances, the autonomous vehicle 108 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 108 may be a fully or partially autonomous vehicle having any other level or classification.

In the illustrated example, the memory 518 of the vehicle computing device 504 stores a localization component 520, a perception component 522, a thermal management component 102, a prediction component 526, a planner component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planner component 528, thermal management component 102, system controller(s) 532, and/or the map(s) may additionally, or alternatively, be accessible to the vehicle 108 (e.g., stored on, or otherwise accessible by, memory remote from the vehicle 108, such as, for example, on memory 540 of one or more computing device 536). In some examples, the memory 540 may include a fan activity component 542.

In at least one example, the localization component 520 may include functionality to receive sensor data from the sensor system(s) 506 to determine a position and/or orientation of the vehicle 108 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 108 within the environment. In some instances, the localization component 520 may utilize SLAM (simultaneous localization and mapping), CLAMS (calibration, localization, and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 108. In some instances, the localization component 520 may provide data to various components of the vehicle 108 to determine an initial position of the vehicle 108 for determining the relevance of an object to the vehicle 108, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 108 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 108 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 108. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 108. In some examples, the prediction component 526 may measure a trace of an object and generate a trajectory for the object based on observed and predicted behavior.

In general, the planner component 528 may determine a path for the vehicle 108 to follow to traverse through an environment. For example, the planner component 528 may determine various routes and trajectories and various levels of detail. For example, the planner component 528 may determine a route to travel from a first location (e.g., a current location) to a second location (e.g., a target location). For purposes of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 108 along at least a portion of the route from the first location to the second location. In at least one example, the planner component 528 may determine how to guide the vehicle 108 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 108.

In other examples, the planner component 528 may alternatively, or additionally, use data from the localization component 520, the perception component 522, and/or the prediction component 526 to determine a path for the vehicle 108 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 108 to a safe stop avoiding all collisions and/or otherwise mitigating damage.

The thermal management component 102 may be perform any of the techniques described with respect to any of FIGS. 1-4 and 6 with respect to determining optimal operating settings for the components of the radiator and air conditioning systems.

In at least one example, the vehicle computing device 504 may include one or more system controllers 532, which may be configured to control steering, propulsion, braking, safety, emitters, communication, and other systems of the vehicle 108. The system controller(s) 532 may communicate with and/or control corresponding systems of the drive system(s) 514 and/or other components of the vehicle 108.

The memory 518 may further include one or more maps 530 that may be used by the vehicle 108 to navigate within the environment. For purposes of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retro reflectivity information, BRDF information, BSSRDF information, and the like). In one example, a map may include a three-dimensional mesh of the environment. In some examples, the vehicle 108 may be controlled based at least in part on the map(s) 530. That is, the map(s) 530 may be used in connection with the localization component 520, the perception component 522, the prediction component 526, and/or the planner component 528 to determine a location of the vehicle 108, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 108. As another example, the camera sensors may include multiple cameras disposed at various locations about the exterior and/or interior of the vehicle 108. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period, in near real-time, etc.

The vehicle 108 may also include one or more emitters 508 for emitting light and/or sound. The emitter(s) 508 may include interior audio and visual emitters to communicate with passengers of the vehicle 108. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 108 may also include one or more communication connections 510 that enable communication between the vehicle 108 and one or more other local or remote computing device(s). For instance, the communication connection(s) 510 may facilitate communication with other local computing device(s) on the vehicle 108 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 108 to communicate with a remote teleoperation computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 108 may include one or more drive systems 514. In some examples, the vehicle 108 may have a single drive system 514. In at least one example, if the vehicle 108 has multiple drive systems 514, individual drive systems 514 may be positioned on opposite ends of the vehicle 108 (e.g., the front and the rear, etc.). In at least one example, the drive system(s) 514 may include one or more sensor systems to detect conditions of the drive system(s) 514 and/or the surroundings of the vehicle 108. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 108 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 108. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 108.

In at least one example, the localization component 520, the perception component 522, the thermal management component 102, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the thermal management component 102, the prediction component 526, the planner component 528, the one or more system controllers 532, and the one or more maps 530 may send their respective outputs to the computing device(s) 536 at a particular frequency, after a lapse of a predetermined period, in near real-time, etc.

In some examples, the vehicle 108 may send sensor data to the computing device(s) 536 via the network(s) 534. In some examples, the vehicle 108 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a fan activity component 542. In some examples, the memory 540 may store one or more of components that are like the component(s) stored in the memory 518 of the vehicle 108. In such examples, the computing device(s) 536 may be configured to perform one or more of the processes described herein with respect to the vehicle 108. In some examples, the fan activity component 542 may perform substantially similar functions as the thermal management component 102.

The processor(s) 516 of the vehicle 108 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 108 may be associated with the computing device(s) 536 and/or components of the computing device(s) 536 may be associated with the vehicle 108. That is, the vehicle 108 may perform one or more of the functions associated with the computing device(s) 536, and vice versa. The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, which are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 6:
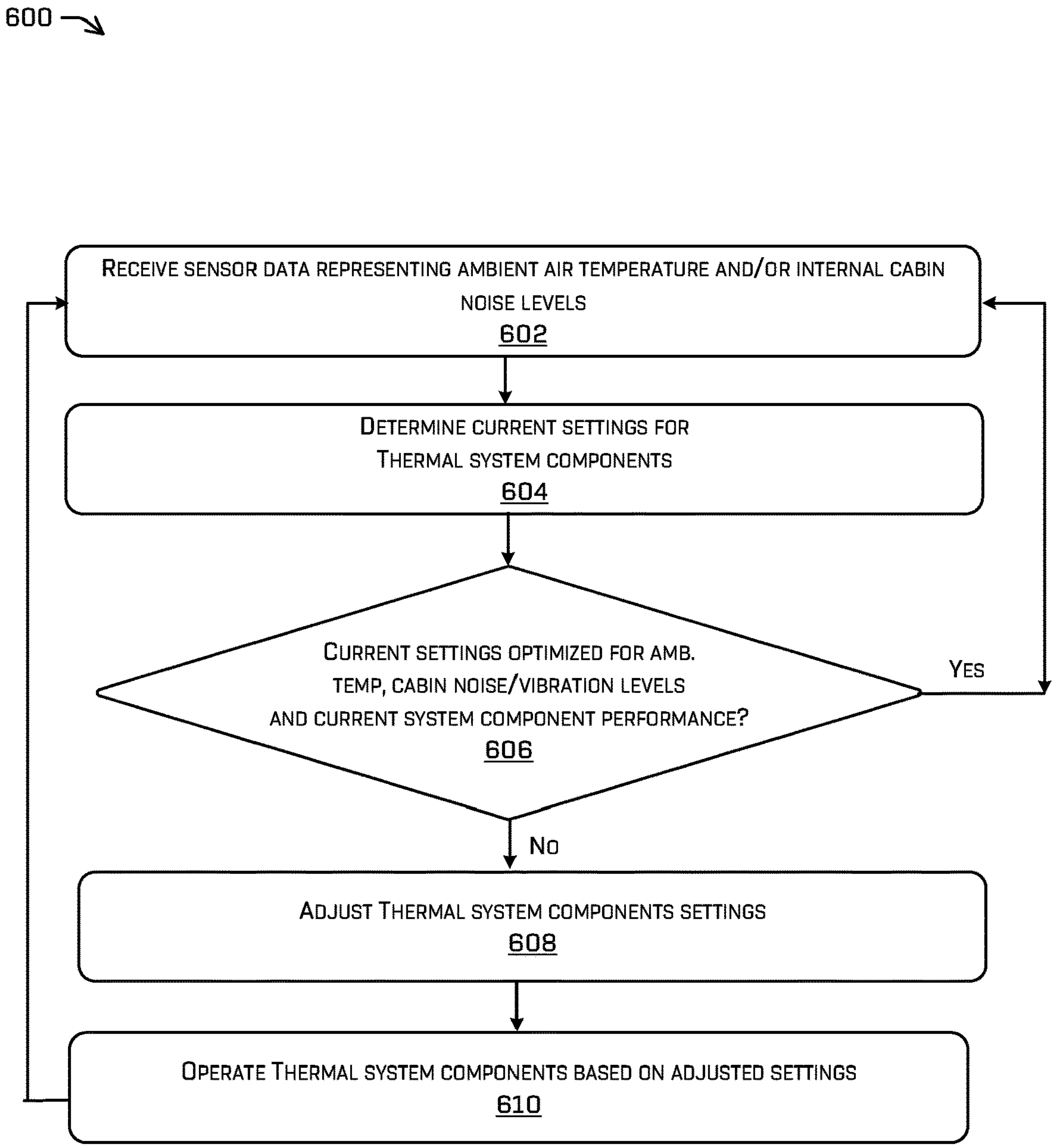
FIG. 6 is a flow diagram illustrating an example process for optimizing operating settings of one or more thermal system components for optimizing energy utilization and thermal loading, noise, vibration, and harshness in a vehicle cabin, in accordance with one or more examples of the disclosure.

FIG. 6 is a flow diagram illustrating an example process for optimizing operating settings of one or more thermal system components for improving noise, vibration, and harshness in a vehicle cabin, in accordance with one or more examples of the disclosure. As described below, the process 600 may be performed by one or more computer-based components configured to implement various functionalities described herein. For instance, some or all of the operations of process 600 may be performed by a thermal management component 102. As described above, a thermal management component 102 may be integrated as an on-vehicle system in some examples. However, in other examples, the thermal management component 102 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the thermal management component 102 may receive sensor data representing an ambient air temperature detected by one or more sensors. Ambient air may be air that is external to the vehicle and/or external to the engine compartment (e.g., outdoor air). In some examples, the vehicle may include multiple sensor devices configured to receive sensor data indicative of the ambient air temperature proximate the sensor device. Further, each sensor device may provide unique sensor data representative of the ambient air temperature proximate the sensor device. Alternatively, at operation 602, the thermal management component 102 may receive sensor data representing a noise or vibration level detected by one or more sensors (e.g., a microphone 240, vibration sensor 242) inside the vehicle cabin 109.

At operation 604, the thermal management component 102 may query the database 342 and system data 130 with the sensor data representing the ambient air temperature exterior of the vehicle cabin 109 or representing the noise or vibration levels inside the vehicle cabin 109. Based on the query to the system data 130, the thermal management component 102 may receive or determine operating settings for each thermal system component associated with the ambient air temperature or interior vehicle cabin noise or vibration level. If the ambient air temperature or interior cabin noise or vibration level do not correspond to values represented in the system data 130, the thermal management component 102 may interpolate, extrapolate, or synthesize thermal system component operating settings based on information available to the thermal management component 102, as described above with reference to FIG. 4, and/or based on one or more machine learning models, statistical models, or a combination thereof for determining changes to optimization settings balance as described above.

At operation 606, the thermal management component may compare the thermal system component operating settings obtained at operation 604 against currently applied operating settings for the thermal system components. If the currently applied operating settings are already optimized where the currently applied operating settings are the same or fall within the acceptable settings ranges for each of thermal system components, then the process 600 may follow the YES branch back to operation 602 and await a change in the ambient air temperature or internal cabin noise or vibration level. If one or more of the thermal system component operating settings returned from the system data 130 do not match or fall within an acceptable operating range for the ambient air temperature or observed interior cabin noise or vibration level, then the process 600 may follow the NO branch to operation 608. For example, as described herein, the thermal management component 102 may determine whether a current system operating setting, such as radiator outlet temperature, is already set for current conditions, then that setting may be left unchanged, but other operating settings may be changed to arrive at a desired operating level.

At operation 608, the thermal management component 102 via the computing system 300 automatically rebalances the operating settings of the thermal system components with the operating settings returned from the lookup table 130 associated with the ambient air temperature or observed interior vehicle noise or vibration level.

At operation 610, the thermal management component 102 operates the thermal system components based on the operating settings returned from the system data 130 or as determined by the thermal management component for current settings and environmental conditions. For example, if the operating settings for the thermal system components show the radiator fan speed is currently above the settings data for the radiator fan speed obtained from the system data 130 based on the ambient air temperature and that the AC condenser blower speed is too low, the thermal management component 102 may optimize the settings of the thermal system components by decreasing the speed of the radiator fan and increasing the speed of the AC condenser blower. By rebalancing the operating settings for the thermal system components, the noise, vibration and harshness environment inside the vehicle cabin 109 will be improved and the thermal performance and energy consumption of the thermal system will be improved as the operating burden on the radiator fan will be relieved by transferring part of the performance work requirement to the AC condenser blower.

According to examples, the steps of the process 600 are performed iteratively in a continuous feedback loop. That is, after operation 610, the process 600 proceeds back to operation 602 and receives sensor data, as described above. Thus, the thermal management component 102 continuously monitors ambient air temperature and cabin noise and/or vibration to determine whether changes are needed to improve NVH in a manner that optimizes thermal system energy efficiency and performance.

Example Clauses

A: A vehicle comprising a radiator system associated with an end of the vehicle and configured to dissipate heat from a portion of the vehicle outside a cabin of the vehicle, the radiator system including a radiator and a radiator fan; an air conditioning system configured to cool an interior of the vehicle, the air conditioning system having one or more air conditioning system components including a compressor, a condenser, a condenser fan, an evaporator and an evaporator fan; and a thermal management system configured to perform one or more operations comprising: determining, based at least in part on an ambient air temperature, a first operating setting for the radiator fan and a second operating setting for the one or more cooling system components; and adjusting, based on the first operating setting, a currently applied operating setting of the radiator fan and adjusting, based on the second operating setting, a currently applied operating setting of the one or more air conditioning system components, the first operating setting and the second operating setting operative to maintain a noise level inside the vehicle cabin at or below a threshold noise level and to optimize thermal system components energy consumption.

B: The vehicle of paragraph A, the first operating setting and the second operating setting are further operative to provide an overall thermal cooling requirement for one or more systems of the vehicle.

C: The vehicle of paragraph A, further comprising a database comprising correlations of first operating settings and second operating settings for providing an overall thermal cooling requirement and a noise level inside the vehicle cabin associated with the first and second operating settings.

D: The vehicle of paragraph A, C, the one or more operations further comprising querying a lookup table in the database for the first and second settings based, at least in part on, the ambient air temperature.

E: The vehicle of paragraph A, The vehicle of claim 1, further comprising an acoustic sensor configured to generate acoustic data associated with a noise level inside the vehicle cabin, wherein the determining, based at least in part on an ambient air temperature, a first operating setting for the radiator fan and a second operating setting for the one or more air conditioning system components is based at least in part on the acoustic data.

F: A vehicle comprising a thermal system having one or more operating components configured to dissipate heat from a portion of the vehicle outside a vehicle cabin and to cool an interior of the vehicle cabin; a thermal management system configured to determine an operating setting for each of the one or more components based at least in part on an ambient air temperature; and the thermal management system being further configured to adjust a currently applied operating setting of each of the one or more components to the determined operating setting for each of the one or more components, the determined operating setting operative to minimize noise inside the vehicle cabin from operation of the one or more components and to optimize overall thermal system components energy consumption.

G: The vehicle of paragraph F, wherein the thermal management system is further configured to query a database based on the ambient air temperature for the determined operating setting for each of the one or more components, the lookup table including an operating setting for each of the one or more components associated with each of a plurality of different ambient air temperatures; and wherein when a query is received at the database based on a given ambient air temperature, the query retrieves an operating setting for each of the one or more components associated with the given ambient air temperature.

H: The vehicle of paragraph F, G, wherein the thermal management system is configured to query the database based on a second ambient air temperature for a second determined operating setting for each of the one or more components; and the thermal management system being further configured to adjust the determined operating setting applied to the one or more components to the second determined operating setting for each of the one or more components.

I: The vehicle of paragraph F, further comprising: an ambient air temperature sensor configured to output the ambient air temperature to the thermal management system; and the thermal management system configured to automatically query a database for the determined operating setting for each of the one or more components in response to receiving the ambient air temperature from the ambient temperature sensor.

J: The vehicle of paragraph F, wherein the one or more operating components configured to dissipate heat from a portion of the vehicle outside a vehicle cabin comprise a radiator system operative to dissipate heat associated with a drive train of the vehicle; and the one or more components configured to cool an interior of the vehicle cabin comprise an air conditioning system operative to cool the interior of the vehicle cabin.

K: The vehicle of paragraph F, J, wherein the one or more components comprising the radiator system operate according to an applied operating setting based on the ambient air temperature; and the one or more components comprising the air conditioning system operate according to an applied operating setting based on the ambient air temperature.

L: The vehicle of paragraph F, J K, wherein the one or more components comprising the radiator system include a radiator a radiator fan; and the one or more components comprising the air conditioning system include an air conditioner condenser, an air conditioner condenser blower, an evaporator, an evaporator blower, and an air conditioner compressor.

M: The vehicle of paragraph F, further comprising a noise detection sensor configured to detect noise inside the vehicle cabin associated with operation of the one or more components, the noise detection sensor operative to output a noise level detected inside the vehicle cabin to the thermal management system; and the thermal management system configured to automatically query a database for a noise-based operating setting for each of the one or more components in response to receiving the detected noise level from the noise detection sensor.

N: The vehicle of paragraph F, M, wherein the thermal management system being further configured to adjust a currently applied operating setting of each of the one or more components to the noise-based operating setting for each of the one or more components, the noise-based operating setting operative to minimize noise inside the vehicle cabin from operation of the one or more components.

O: The vehicle of paragraph F, wherein the thermal management system being further configured to adjust a currently applied operating setting of each of the one or more components to the noise-based operating setting for each of the one or more components, the noise-based operating setting operative to minimize noise inside the vehicle cabin from operation of the one or more components.

P: The vehicle of paragraph F, further comprising a vibration detection sensor configured to detect vibration inside the vehicle cabin associated with operation of the one or more components, the vibration detection sensor operative to output a vibration level detected inside the vehicle cabin to the thermal management system; and the thermal management system configured to automatically query a database for a vibration-based operating setting for each of the one or more components in response to receiving the detected vibration level from the vibration detection sensor.

Q: The vehicle of paragraph F, wherein the thermal management system is further configured to determine the operating setting for each of the one or more components based at least in part on an ambient air temperature on a continuous basis; and the thermal management system being further configured to adjust a currently applied operating setting of each of the one or more components to the determined operating setting for each of the one or more components as operating settings and as one or more environment conditions including at least one of ambient air temperature, cabin noise level and cabin vibration level changes.

R: A system comprising one or more processors; and one or more non-transitory computer-readable media storing computer-executable instructions that, when executed, cause the one or more processors to perform operations comprising: receiving, from a temperature sensor associated with a vehicle in an environment, data representing an ambient air temperature; determining, based at least in part on the temperature sensor data, an operating setting for each of one or more components of a vehicle thermal system; applying the determined operating setting for each of the one or more components; and operating the one or more components based on the determined operating setting for each of the one or more components for maintaining a noise level inside the vehicle cabin at or below a threshold noise level.

S: The system of paragraph R, receiving data from the temperature sensor data representing an updated ambient air temperature; determining, based at least in part on the temperature sensor data representing the updated ambient air temperature, an updated operating setting for each of one or more components of a vehicle thermal system; and operating the one or more components based on the updated operating setting for each of the one or more components.

T: The system of paragraph R, prior to determining, based at least in part on the temperature sensor data, an operating setting for each of one or more components of a vehicle thermal system, querying a database for an operating setting for each of one or more components of a vehicle thermal system.

U: The system of paragraph R, S wherein querying a database for an operating setting for each of one or more components of a vehicle thermal system includes querying a database lookup table including an operating setting for each of the one or more components associated with each of a plurality of different ambient air temperatures; and wherein when a query is received at the database based on a given ambient air temperature, retrieving an operating setting for each of the one or more components associated with the given ambient air temperature.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All the methods and processes described above may be embodied in, and fully automated via, software code modules and/or computer-executable instructions executed by one or more computers or processors, hardware, or some combination thereof. Some or all the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:

a radiator system associated with an end of the vehicle and configured to dissipate heat from a portion of the vehicle outside a cabin of the vehicle, the radiator system including a radiator and a radiator fan;

an air conditioning system configured to cool an interior of the vehicle, the air conditioning system having one or more air conditioning system components including a compressor, a condenser, a condenser fan, an evaporator and an evaporator fan; and a thermal management system configured to perform one or more operations comprising:

determining, based at least in part on an ambient air temperature, a first operating setting for the radiator fan and a second operating setting for the one or more air conditioning system components; and adjusting, based on the first operating setting, a currently applied operating setting of the radiator fan and adjusting, based on the second operating setting, a currently applied operating setting of the one or more air conditioning system components, the first operating setting and the second operating setting operative to maintain a noise level inside the cabin at or below a threshold noise level and to reduce energy consumption of one or more components of the radiator system and the one or more components of the air conditioning system.

2. The vehicle of claim 1, wherein:

the first operating setting and the second operating setting are further operative to provide an overall thermal cooling requirement for one or more systems of the vehicle.

3. The vehicle of claim 1, further comprising a database comprising correlations of first operating settings and second operating settings for providing an overall thermal cooling requirement and noise levels inside the cabin associated with the first operating settings and the second operating settings.

4. The vehicle of claim 3, the one or more operations further comprising querying a lookup table in the database for the first operating setting and the second operating setting based, at least in part on, the ambient air temperature.

5. The vehicle of claim 1, further comprising an acoustic sensor configured to generate acoustic data associated with the noise level inside the cabin, wherein the determining, based at least in part on an ambient air temperature, a first operating setting for the radiator fan and a second operating setting for the one or more air conditioning system components is based at least in part on the acoustic data.

6. A vehicle comprising:

a thermal system having one or more components configured to dissipate heat from a portion of the vehicle outside a vehicle cabin and to cool an interior of the vehicle cabin;

a thermal management system configured to:

determine an operating setting for the one or more components based at least in part on an ambient air temperature, and adjust a currently applied operating setting of the one or more components to the determined operating setting for the one or more components, the determined operating setting operative to reduce noise inside the vehicle cabin associated with operation of the one or more components and to reduce overall energy consumption of the one or more components; and a noise detection sensor configured to detect the noise inside the vehicle cabin associated with the operation of the one or more components, the noise detection sensor operative to output a noise level detected inside the vehicle cabin to the thermal management system, wherein the thermal management system is configured to automatically query a database for a noise-based operating setting for the one or more components in response to receiving the detected noise level from the noise detection sensor.

7. The vehicle of claim 6, wherein the thermal management system is further configured to query the database based on the ambient air temperature for the determined operating setting for the one or more components, the database including a respective operating setting for the one or more components associated with each of a plurality of different ambient air temperatures; and wherein when a query is received at the database based on a given ambient air temperature, the query retrieves the operating setting for the one or more components associated with the given ambient air temperature.

8. The vehicle of claim 7, wherein;

the thermal management system is configured to query the database based on a second ambient air temperature for a second determined operating setting for the one or more components; and the thermal management system is further configured to adjust the determined operating setting applied to the one or more components to the second determined operating setting for the one or more components.

9. The vehicle of claim 6, further comprising:

an ambient air temperature sensor configured to output the ambient air temperature to the thermal management system; and the thermal management system configured to automatically query the database for the determined operating setting for the one or more components in response to receiving the ambient air temperature from the ambient temperature sensor.

10. The vehicle of claim 6, wherein;

the one or more components comprise a radiator system operative to dissipate heat from a portion of the vehicle outside the vehicle cabin; and the one or more components comprise an air conditioning system operative to cool an interior of the vehicle cabin.

11. The vehicle of claim 10, wherein the radiator system and the air conditioning system operate according to respective applied operating settings based on the ambient air temperature.

12. The vehicle of claim 11, wherein:

the radiator system includes a radiator a radiator fan; and the air conditioning system includes an air conditioner condenser, an air conditioner condenser blower, an evaporator, an evaporator blower, and an air conditioner compressor.

13. The vehicle of claim 6, wherein the thermal management system is further configured to adjust the currently applied operating setting of the one or more components to the noise-based operating setting for the one or more components, the noise-based operating setting operative to reduce the noise inside the vehicle cabin from the operation of the one or more components.

14. The vehicle of claim 6, further comprising:

a vibration detection sensor configured to detect vibration inside the vehicle cabin associated with the operation of the one or more components, the vibration detection sensor operative to output a vibration level detected inside the vehicle cabin to the thermal management system, wherein the thermal management system is configured to automatically query a database for a vibration-based operating setting for the one or more components in response to receiving the detected vibration level from the vibration detection sensor.

15. The vehicle of claim 6, wherein;

the thermal management system is further configured to determine the operating setting for the one or more components based at least in part on the ambient air temperature on a continuous basis; and the thermal management system is further configured to adjust the currently applied operating setting of the one or more components to the determined operating setting for the one or more components as operating settings and as one or more environment conditions including at least one of the ambient air temperature, a cabin noise level change, or a cabin vibration level change.

16. A system comprising:

one or more processors; and one or more non-transitory computer-readable media storing computer-executable instructions that, when executed, cause the one or more processors to perform operations comprising:

receiving, from a temperature sensor associated with a vehicle in an environment, data representing an ambient air temperature;

determining, based at least in part on the data, an operating setting for one or more components of a vehicle thermal system;

applying the determined operating setting for the one or more components; and operating the one or more components based on the determined operating setting for the one or more components for maintaining a noise level inside a vehicle cabin at or below a threshold noise level, wherein the operations further comprise:

prior to determining, based at least in part on the data, the operating setting for the one or more components of the vehicle thermal system, querying a database for the operating setting for the one or more components of the vehicle thermal system.

17. The system of claim 16, the operations further comprising:

receiving updated data representing an updated ambient air temperature from the temperature sensor;

determining, based at least in part on the updated data representing the updated ambient air temperature, an updated operating setting for the one or more components of the vehicle thermal system; and operating the one or more components based on the updated operating setting for the one or more components.

18. The system of claim 17, wherein;

querying the database for the operating setting for the one or more components of the vehicle thermal system includes querying a database lookup table including a respective operating setting for the one or more components associated with each of a plurality of different ambient air temperatures; and when a query is received at the database based on a given ambient air temperature, retrieving a corresponding operating setting for the one or more components associated with the given ambient air temperature.

* * * * *